US012790062B2

(12) United States Patent
Lin

(10) Patent No.: US 12,790,062 B2
(45) Date of Patent: Nov. 10, 2026

(54) LABEL DISPENSING DEVICE

(71) Applicant: NANYA TECHNOLOGY CORPORATION, New Taipei City (TW)

(72) Inventor: Wei Chun Lin, New Taipei City (TW)

(73) Assignee: NANYA TECHNOLOGY CORPORATION, New Taipei City (TW)

( * ) Notice: Subject to any disclaimer, the term of this patent is extended or adjusted under 35 U.S.C. 154(b) by 148 days.

(21) Appl. No.: 18/900,624

(22) Filed: Sep. 27, 2024

(65) Prior Publication Data

US 2026/0091904 A1 Apr. 2, 2026

(51) Int. Cl.

*B65C 11/02* (2006.01)
*B65C 9/00* (2006.01)
*B65C 9/18* (2006.01)

(52) U.S. Cl.

CPC .......... *B65C 9/1865* (2013.01); *B65C 9/0006* (2013.01); *B65C 11/02* (2013.01)

(58) Field of Classification Search

CPC .............................. B65C 9/1865; B65C 11/02
See application file for complete search history.

(56) References Cited

U.S. PATENT DOCUMENTS

2011/0132544 A1 * 6/2011 McNestry .............. B65H 19/28
156/361

FOREIGN PATENT DOCUMENTS

CN 209336293 U 9/2019
TW I411557 B 10/2013

* cited by examiner

*Primary Examiner* — Gene O Crawford
*Assistant Examiner* — Ayodeji H Ojofeitimi
(74) *Attorney, Agent, or Firm* — CKC & Partners Co., LLC

(57) ABSTRACT

A label dispensing device includes a housing having a label outlet, a collection reel, a feeding reel, a driving mechanism and a peeling mechanism. The collection reel and the feeding reel are rotatably disposed in the housing. The driving mechanism drives one of the feeding reel and the collection reel for conveying a label strip from the feeding reel to the collection reel. The peeling mechanism is disposed in the housing and used to change a conveying direction of the label strip being pulled from the feeding reel towards the label outlet into a recycled direction intersected with the conveying direction from the peeling mechanism downwardly for peeling off one of label stickers from the label strip when the label sticker is passing the peeling mechanism.

13 Claims, 7 Drawing Sheets

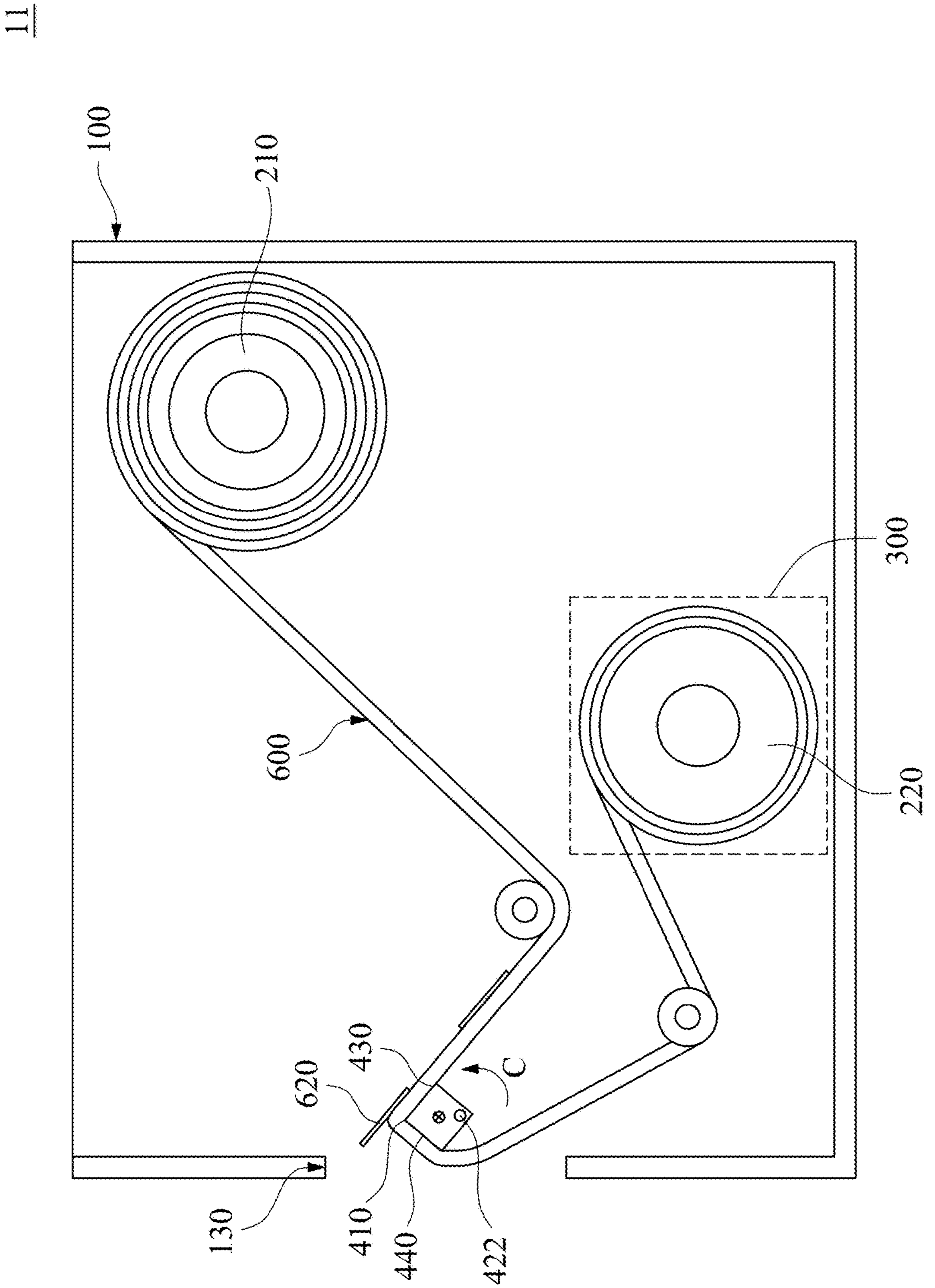
Fig. 5B
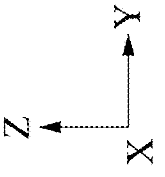

LABEL DISPENSING DEVICE

BACKGROUND

Field of Invention

The present disclosure relates to a label dispensing device. More particularly, the present disclosure relates to a label dispensing device being able to reduce the possibilities of label stickers being recycled along with a release film of a label strip.

Description of Related Art

Generally, a traditional label dispensing device is mainly used to peel off label stickers arranged in sequence on a feed reel one by one and sequentially attach them onto each of finished products, and then collect the remaining release film to be recycled onto a collection reel.

However, due to poor design of the traditional device, some label stickers which is not peeled off from the release film in time could be recycled along with the remaining release film, thereby resulting in label dispensing failure, so that not enough label stickers can be used for being attached to subsequent products.

Thus, the above-mentioned technology obviously still has inconveniences and defects, which are issues that the industry needs to solve urgently.

SUMMARY

One aspect of the present disclosure is to provide a label dispensing device for solving the difficulties mentioned above in the prior art.

In one embodiment of the present disclosure, a label dispensing device is implemented to peel off label stickers from a label strip in sequence one by one, and the label dispensing device includes a housing, a roll-feeding mechanism, a driving mechanism and a peeling mechanism. The housing includes a label outlet at one side of the housing. The roll-feeding mechanism includes a collection reel and a feeding reel which are rotatably installed in the housing. The driving mechanism is connected to one of the feeding reel and the collection reel for conveying the label strip from the feeding reel to the collection reel. The peeling mechanism is installed in the housing and facing towards the label outlet, and a highest position of the peeling mechanism is provided with a redirecting protrusive portion. The label strip is wound onto the feeding reel and the collection reel, respectively and bypassed the redirecting protrusive portion. The redirecting protrusive portion is allowed to change a conveying direction of the label strip pulled from the feeding reel towards the label outlet into a recycled direction intersected with the conveying direction from the peeling mechanism downwardly for peeling off one of the label stickers from the label strip.

According to one or more embodiments of the present disclosure, the label dispensing device further includes a label printer located between the redirecting protrusive portion and the feeding reel, and used to print one of the label stickers on the label strip.

According to one or more embodiments of the present disclosure, in the label dispensing device, an included angle formed between two adjacent sides of the redirecting protrusive portion is in a range of 60° to 75°.

According to one or more embodiments of the present disclosure, in the label dispensing device, the conveying direction of the label strip being pulled from the feeding reel towards the label outlet is gradually rising inclined, and the recycled direction is as a gravity direction.

According to one or more embodiments of the present disclosure, in the label dispensing device, the peeling mechanism comprises a long column body, and the long column body includes a long axis direction that is parallel to a rotation axis of the feeding reel. A cross section of the long column body is one of a right triangle, a rhombus and an inverted V shape, and a corner between two adjacent sides of the cross section is served as the redirecting protrusive portion.

According to one or more embodiments of the present disclosure, in the label dispensing device, the peeling mechanism further includes at least one pivot and a rectangular column. The rectangular column is rotatably disposed within the housing through the pivot, and the rectangular column has a long axis direction that is parallel to a rotation axis of the feeding reel. When the rectangular column is rotated about the long axis direction of the rectangular column to change a cross section of the rectangular column to be a rhombus from a square, a corner between two adjacent sides of the rhombus is served as the redirecting protrusive portion.

According to one or more embodiments of the present disclosure, in the label dispensing device, the housing further comprises a latch. The latch is movably disposed on the housing for switchably abutting against the rectangular column to stop the rectangular column from rotating.

According to one or more embodiments of the present disclosure, in the label dispensing device, the peeling mechanism further includes a plurality of first studs, a plurality of second studs and a plurality of third studs. The first studs are straightly screwed on a base fixed in the housing and linearly arranged along a rotation axis of the feeding reel. The second studs are straightly screwed on the base and linearly arranged along the rotation axis of the feeding reel. The third studs are straightly screwed on the base and linearly arranged along the rotation axis of the feeding reel. The second studs are located between the third studs and the first studs, and a length of each of the second studs is greater than a length of each of the third studs, and less than a length of each of the first studs. A combination of heads of the first studs is served as the redirecting protrusive portion.

According to one or more embodiments of the present disclosure, in the label dispensing device, the roll-feeding mechanism further includes a first redirecting roller rotatably located in the housing, arranged between the peeling mechanism and the feeding reel, and used to change the conveying direction of the label strip from the feeding reel to the peeling mechanism. The first redirecting roller is lower than the feeding reel and the peeling mechanism.

According to one or more embodiments of the present disclosure, in the label dispensing device, the roll-feeding mechanism further includes a second redirecting roller rotatably located in the housing, arranged between the label outlet and the collection reel, and used to change the conveying direction of the label strip from the peeling mechanism to the collection reel. The second redirecting roller is lower than the peeling mechanism.

In one embodiment of the present disclosure, a label dispensing device implemented to peel off label stickers from a label strip in sequence one by one, and the label dispensing device includes a housing, a roll-feeding mechanism, a driving mechanism and a peeling mechanism. The housing includes a label outlet at one side of the housing.

The roll-feeding mechanism includes a collection reel and a feeding reel which are rotatably installed in the housing. The driving mechanism is connected to one of the feeding reel and the collection reel for conveying the label strip from the feeding reel to the collection reel. The peeling mechanism is installed in the housing and arranged between the feeding reel and the label outlet. The label strip is wound onto the feeding reel and the collection reel respectively and bypassed the peeling mechanism. The peeling mechanism includes a peeling part and a gradually rising part. The gradually rising part is located between the peeling part and the feeding reel, connected to the peeling part, extended along a gradually rising inclined direction towards the label outlet, and used to guide one of the label stickers on the label strip towards the label outlet from the feeding reel, and the peeling part is extended away from the gradually rising part along a recycled direction intersected with the gradually rising inclined direction, and used to fold the label strip downwardly from the gradually rising part to peel off the one of the label stickers from the label strip when the one of the label stickers is passing the gradually rising part. An included angle formed between the gradually rising inclined direction and the recycled direction is one of an acute angle and a right angle.

According to one or more embodiments of the present disclosure, the label dispensing device further includes a label printer located between the gradually rising part and the feeding reel, and used to print one of the label stickers on the label strip.

According to one or more embodiments of the present disclosure, in the label dispensing device, the included angle is in a range of 60° to 75°.

According to one or more embodiments of the present disclosure, in the label dispensing device, the peeling mechanism comprises a long column body, and the long column body comprises a long axis direction that is parallel to a rotation axis of the feeding reel. A cross section of the long column body is one of a right triangle, a rhombus and an inverted V shape, and two adjacent sides of the cross section are served as the peeling part and the gradually rising part, respectively.

According to one or more embodiments of the present disclosure, in the label dispensing device, the peeling mechanism further includes at least one pivot and a rectangular column. The rectangular column is rotatably disposed within the housing through the pivot, and the rectangular column has a long axis direction that is parallel to a rotation axis of the feeding reel. When the rectangular column is rotated about the long axis direction of the rectangular column to change a cross section of the rectangular column to be a rhombus from a square, two adjacent sides of the rectangular column are served as the peeling part and the gradually rising part, respectively.

According to one or more embodiments of the present disclosure, in the label dispensing device, the housing further comprises a latch. The latch is movably disposed on the housing for switchably abutting against the rectangular column to stop the rectangular column from rotating.

According to one or more embodiments of the present disclosure, in the label dispensing device, the peeling mechanism further includes a plurality of first studs, a plurality of second studs and a plurality of third studs. The first studs are straightly screwed on a base fixed in the housing and linearly arranged along a rotation axis of the feeding reel. The second studs are straightly screwed on the base and linearly arranged along the rotation axis of the feeding reel. The third studs are straightly screwed on the base and linearly arranged along the rotation axis of the feeding reel. The second studs are located between the third studs and the first studs, and a length of each of the second studs is greater than a length of each of the third studs, and less than a length of each of the first studs. A combination of heads of the first studs, heads of the second studs and heads of the third studs is served as the gradually rising part, and a combination of rods of the first studs is served as the peeling part.

According to one or more embodiments of the present disclosure, in the label dispensing device, the roll-feeding mechanism further includes a first redirecting roller rotatably located in the housing, arranged between the peeling mechanism and the feeding reel, and used to change a conveying direction of the label strip from the feeding reel to the peeling mechanism. The first redirecting roller is lower than the feeding reel and the peeling mechanism.

According to one or more embodiments of the present disclosure, in the label dispensing device, the roll-feeding mechanism further includes a second redirecting roller rotatably located in the housing, arranged between the label outlet and the collection reel, and used to change a conveying direction of the label strip from the peeling mechanism to the collection reel. The second redirecting roller is lower than the peeling mechanism.

Thus, through the construction of the embodiments above, the label dispensing device is provided with a narrower angle formed between two adjacent sides of the peeling mechanism, so that the strength of the label sticker being teared off from the label strip can be enhanced, and the label stickers will be easier to peel off. Thereby, solving the problem of poor paper discharge, and reducing the possibilities of label stickers being recycled along with a release film of a label strip, so that subsequent products can be attached with enough label stickers.

The above description is merely used for illustrating the problems to be resolved, the technical methods for resolving the problems and their efficacies, etc. The specific details of the present disclosure will be explained in the embodiments below and related drawings.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain the principles of the present disclosure.

FIG. 5A and FIG. 5B are operational schematic diagrams of a label dispensing device according to one embodiment of the present disclosure.

DETAILED DESCRIPTION

Figure 1:
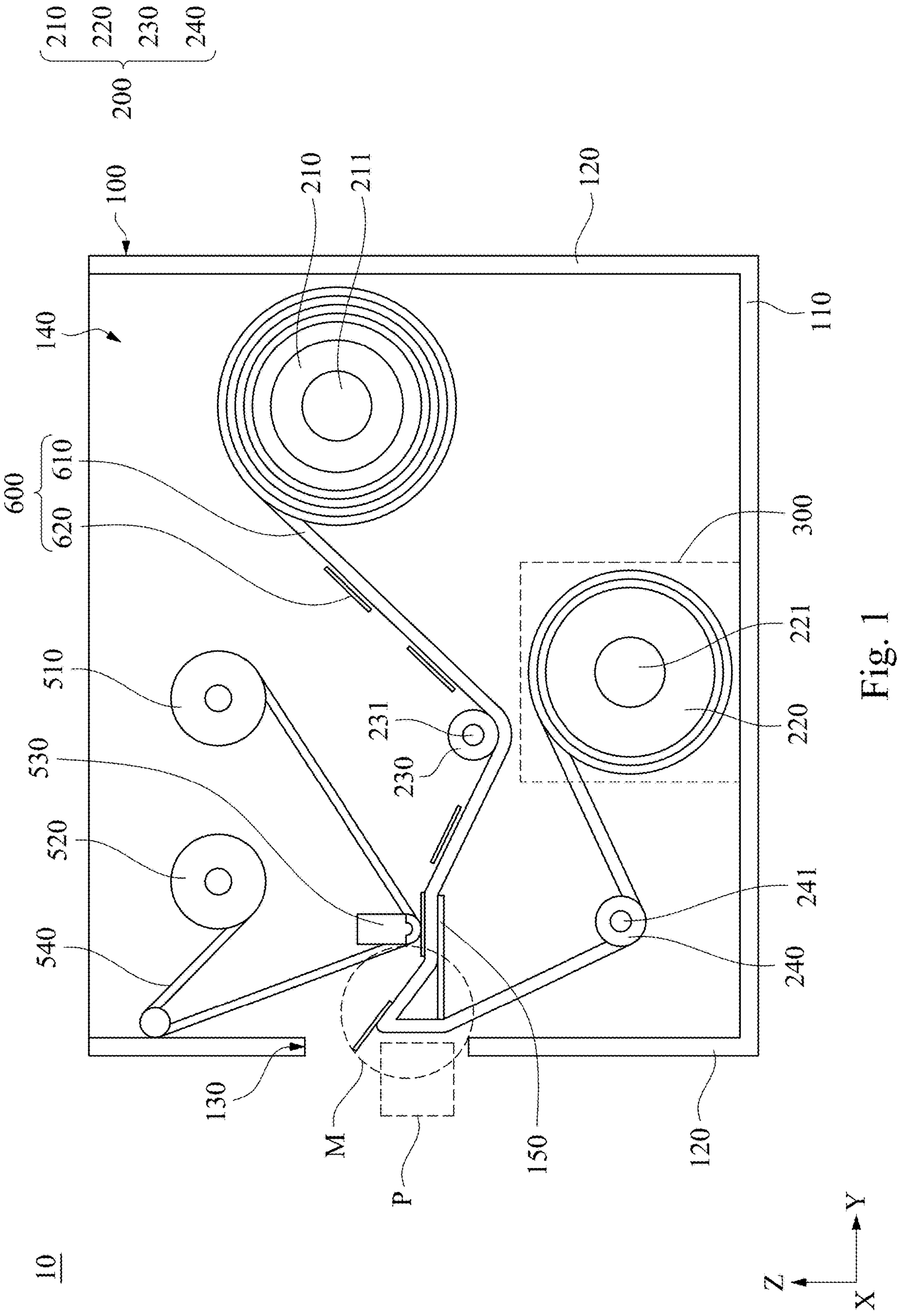
FIG. 1 is a schematic side view of a label dispensing device according to one embodiment of the present disclosure.

Reference will now be made in detail to the present embodiments of the present disclosure, examples of which are illustrated in the accompanying drawings. Wherever possible, the same reference numbers are used in the drawings and the description to refer to the same or like parts. According to the embodiments, it will be apparent to those skilled in the art that various modifications and variations can be made to the structure of the present disclosure without departing from the scope or spirit of the present disclosure.

Figure 2:
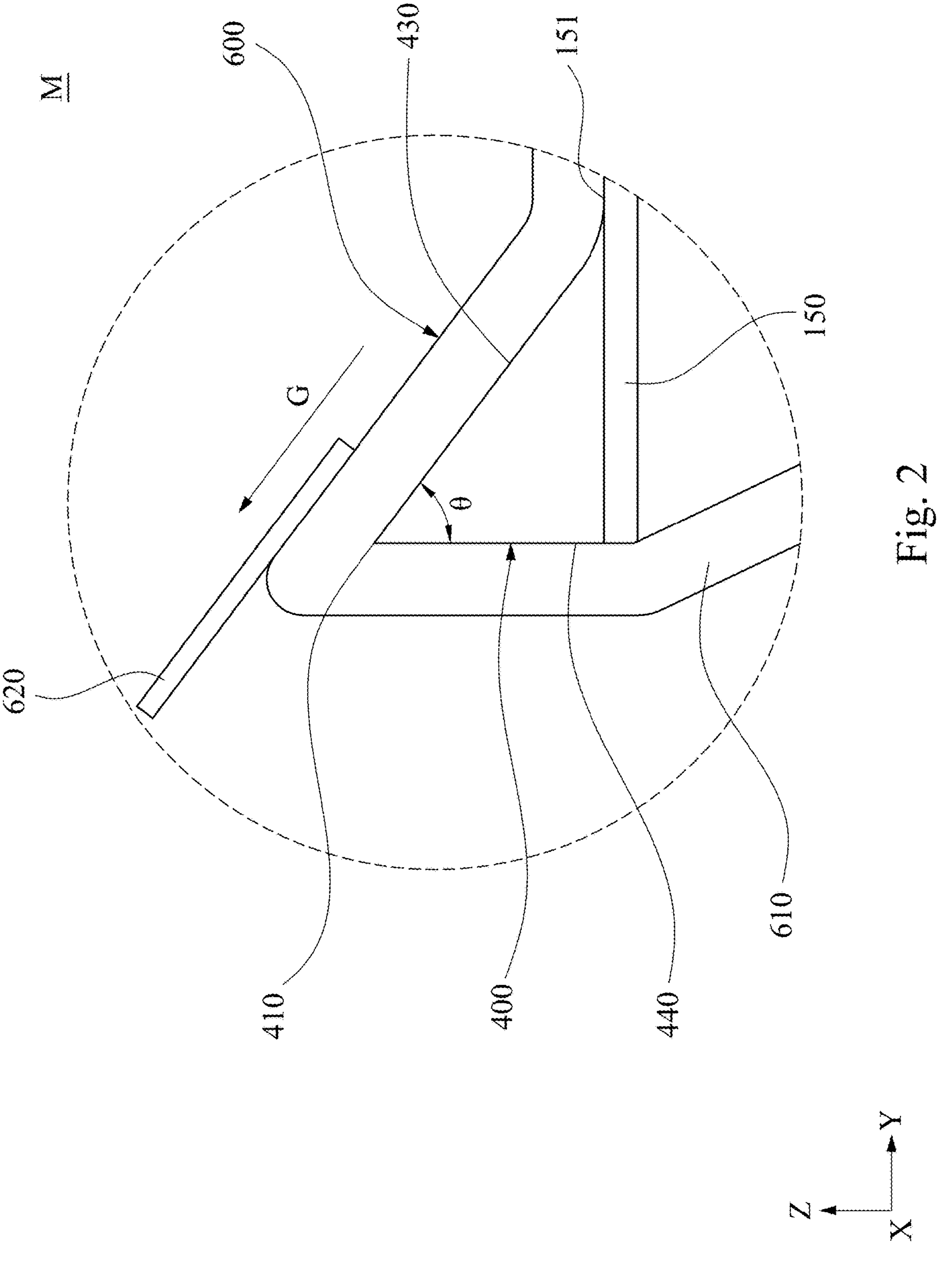
FIG. 2 is a partial enlargement view of an area M in FIG. 1.
Figure 4:
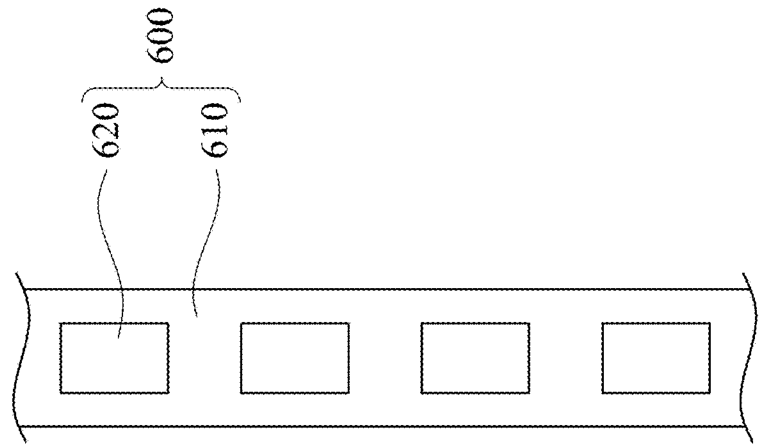
FIG. 4 is a partial schematic view of a label strip in FIG. 1.
Figure 3:
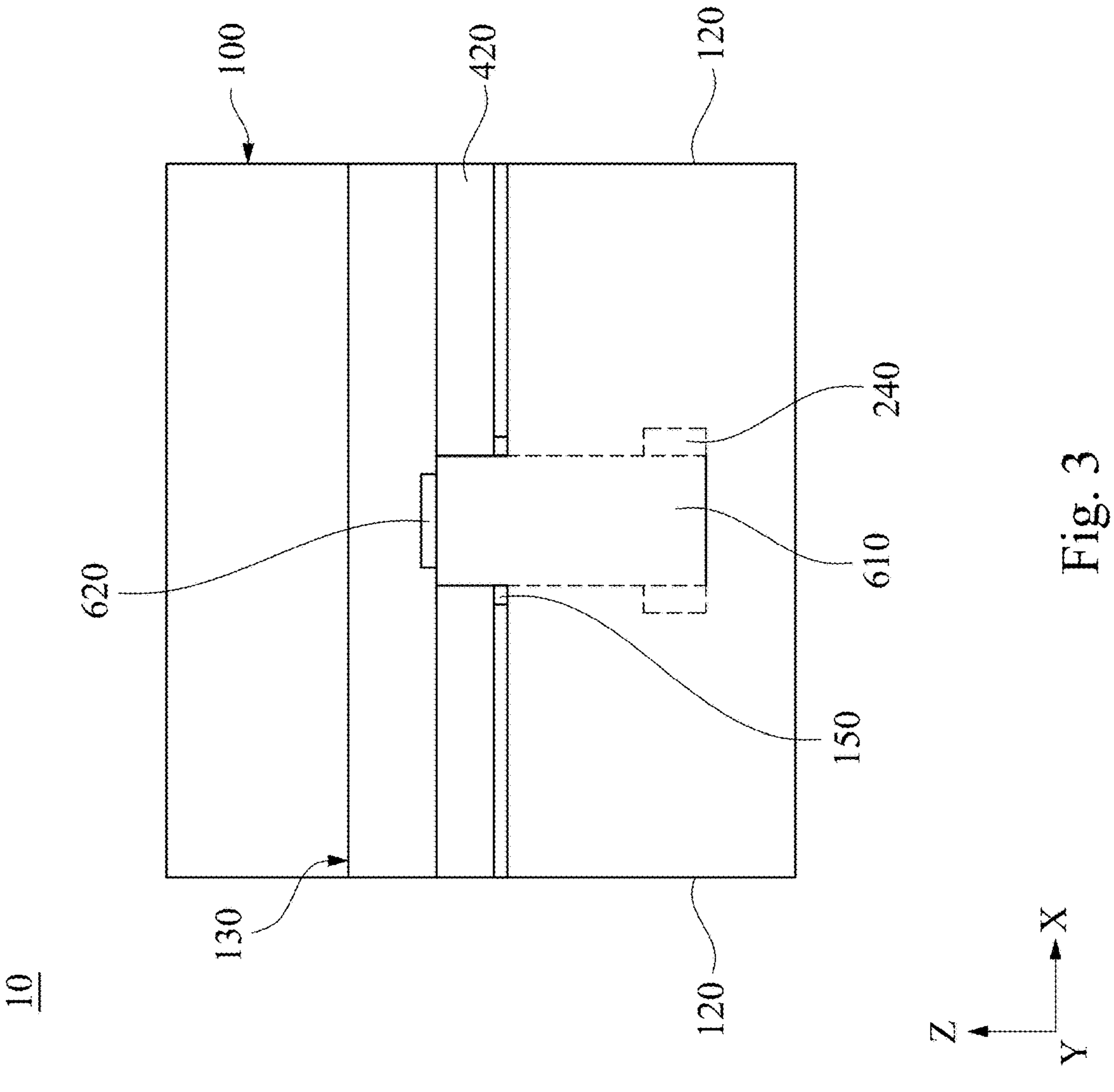
FIG. 3 is a front view of the label dispensing device in FIG. 1.

Reference is now made to FIG. 1 to FIG. 4, in which FIG. 1 is a schematic side view of a label dispensing device 10 according to one embodiment of the present disclosure, FIG. 2 is a partial enlargement view of an area M in FIG. 1, and FIG. 3 is a front view of the label dispensing device 10 in FIG. 1. FIG. 4 is a partial schematic view of a label strip 600 in FIG. 1. As shown in FIG. 1 and FIG. 2, in this embodiment, the label dispensing device 10 is implemented to peel off label stickers 620 from a label strip 600 one by one for attaching on each of finished products P. The label dispensing device 10 includes a housing 100, a roll-feeding mechanism 200, a driving mechanism 300 and a peeling mechanism 400. The roll-feeding mechanism 200 includes a collection reel 220 and a feeding reel 210. The label strip 600 is wound onto the feeding reel 210 and the collection reel 220 respectively and bypassed the peeling mechanism 400. The driving mechanism 300 continually conveys the label strip 600 from the feeding reel 210 to the collection reel 220 through the peeling mechanism 400. The peeling mechanism 400 changes a conveying direction of the label strip 600 pulled from the feeding reel 210 towards a label outlet 130 of the housing 100 into a recycled direction intersected with the conveying direction from the peeling mechanism 400 downwardly. Thus, when one of the label stickers 620 is passing the peeling mechanism 400, the label sticker 620 on the peeling mechanism 400 can be peeled off from the label strip 600.

For example, as shown in FIG. 4, the label strip 600 includes a continual release film 610 and the label stickers 620 from the continual release film 610 at intervals, and each of the label stickers 620 that is with low-viscosity, is pasted on the continual release film 610.

Specifically, the housing 100, for example includes a bottom plate 110 and a plurality of side plates 120. The side plates 120 surround and adjoin edges of the bottom plate 110 so that an interior space 140 is collectively formed by the bottom plate 110 and the side plates 120. The label outlet 130 shown as an opening in this embodiment is formed on one of the side plates 120, however, the present disclosure is not limited to the form of the label outlet 130.

The collection reel 220 and the feeding reel 210 are rotatably located in the interior space 140 of the housing 100. The feeding reel 210 is greater than the collection reel 220 in height, that is, the feeding reel 210 is higher than the collection reel 220 in the Z axis direction. In addition, the roll-feeding mechanism 200 further includes a first redirecting roller 230 and a second redirecting roller 240. The first redirecting roller 230 is rotatably installed in the housing 100, arranged between the peeling mechanism 400 and the feeding reel 210 for changing the conveying direction of the label strip 600 from the feeding reel 210 to the peeling mechanism 400. The first redirecting roller 230 is less than the feeding reel 210 and the peeling mechanism 400 in height, that is, the feeding reel 210 is lower than the feeding reel 210 and the peeling mechanism 400 in the Z axis direction. The second redirecting roller 240 is rotatably installed in the housing 100, arranged between the label outlet 130 and the collection reel 220 for changing the conveying direction of the label strip 600 from the peeling mechanism 400 to the collection reel 220. The second redirecting roller 240 is less than the peeling mechanism 400 in height, that is, the second redirecting roller 240 is lower than the peeling mechanism 400 in the Z axis direction.

Specifically, the feeding reel 210 is pivotally connected in the housing 100 through a first pivot shaft 211. The collection reel 220 is pivotally connected in the housing 100 through a second pivot shaft 221. The first redirecting roller 230 is pivotally connected in the housing 100 through a third pivot shaft 231. The second redirecting roller 240 is pivotally connected in the housing 100 through a fourth pivot shaft 241. The first pivot shaft 211, the second pivot shaft 221, the third pivot shaft 231 and the fourth pivot shaft 241 and the axis direction X are parallel to one another. Thus, the feeding reel 210, the collection reel 220, the first redirecting roller 230 and the second redirecting roller 240 can rotate about a long axis direction (i.e., rotation axis) of their pivot shafts 211, 221, 231, 241, respectively.

The driving mechanism 300 is fixed to the second pivot shaft 221 of the collection reel 220. When the driving mechanism 300 is triggered, the driving mechanism 300 can drive the feeding reel 210 and the collection reel 220 to rotate so as to continually convey the label strip 600 from the feeding reel 210 to the collection reel 220. For example, the driving mechanism 300 can be a motor or other similar machine. However, the present disclosure is not limited thereto, in another embodiment, the driving mechanism 300 may also be connected to the first pivot shaft 211 of the feeding reel 210 or both of them.

The peeling mechanism 400 is installed in the housing 100, arranged between the feeding reel 210 and the label outlet 130. In this embodiment, The peeling mechanism 400 is located in the housing 100 closed to the label outlet 130, and a highest position of the peeling mechanism 400 is provided with a redirecting protrusive portion 410, and the redirecting protrusive portion 410 is able to change the conveying direction of the label strip 600 being pulled from the feeding reel 210 to the label outlet 130 into the recycled direction intersected with the conveying direction from the peeling mechanism 400 downwardly for peeling off one of the label stickers 620 from the label strip 600 when the label sticker 620 is passing the redirecting protrusive portion 410.

For example, the peeling mechanism 400 includes a long column body 420 fixed between the opposite side plates 120. A long axis direction of the long column body 420 is parallel to the rotation axis (e.g., X axis direction) of the feeding reel 210 (FIG. 1). The cross section of the long column body 420 is a right triangle, and the redirecting protrusive portion 410 is a corner of the right triangle that is directed upwardly. The peeling mechanism 400 for example, is made of metal such as stainless steel, copper or aluminum, however, the disclosure is not limited to the material of the peeling mechanism 400. Also, in another embodiment, the cross section of the long column body 420 may also be a rhombus or an inverted V shape.

Furthermore, two adjacent sides of the right triangle are respectively called as a gradually rising part 430 and a peeling part 440. The gradually rising part 430 is located between the peeling part 440 and the feeding reel 210, connected to the peeling part 440, and extended along a gradually rising inclined direction G towards the label outlet 130. The peeling part 440 is extended away from the gradually rising part 430 along a gravity direction (e.g., Z axis direction). For example, the included angle θ formed between two adjacent sides (i.e., the gradually rising part 430 and the peeling part 440) of the redirecting protrusive portion 410 is an acute angle, for example, in a range of 60° to 75°, however, the disclosure is not limited thereto.

Thus, when the label strip 600 is pulled to the peeling mechanism 400 from the first redirecting roller 230, the gradually rising part 430 guides one of the label stickers 620 towards the label outlet 130 along the gradually rising inclined direction G. When the label sticker 620 is passing the gradually rising part 430 and the redirecting protrusive portion 410, and the peeling part 440 guides and folds a part of the continual release downwardly along the gravity direction, the label strip 600 can peel the label sticker 620 off from the continual release film 610.

Specifically, the housing 100 further includes a base 150 fixed within the interior space 140 and facing towards the label outlet 130, and allowed the peeling mechanism 400 to be installing on a flat top surface 151 of the base 150, however, the present disclosure is not limited thereto.

The label dispensing device 10 further includes a paper roller 510, a collection roller 520 and a label printer 530. The paper roller 510 and the recycle roller are rotatably installed in the housing 100, and a carbon paper strip 540 is wound onto the paper roller 510 and the collection reel 220 respectively and bypassed the label printer 530. The label printer 530 is located between the gradually rising part 430 of the peeling mechanism 400 and the feeding reel 210, and placed above the flat top surface 151 of the base 150. Thus, before the label strip 600 is pulled to the peeling mechanism 400 from the first redirecting roller 230, when one of the label stickers 620 on the label strip 600 is moved on the flat top surface 151 of the base 150, the label printer 530 can print the label sticker 620 on the label strip. in addition, when the area of the carbon paper strip 540 has been used by the label printer 530, the collection roller 520 is driven to rotate so as to pull a fresh area of the carbon paper strip 540 from the paper roller 510 to the label printer 530.

Figure 5A:
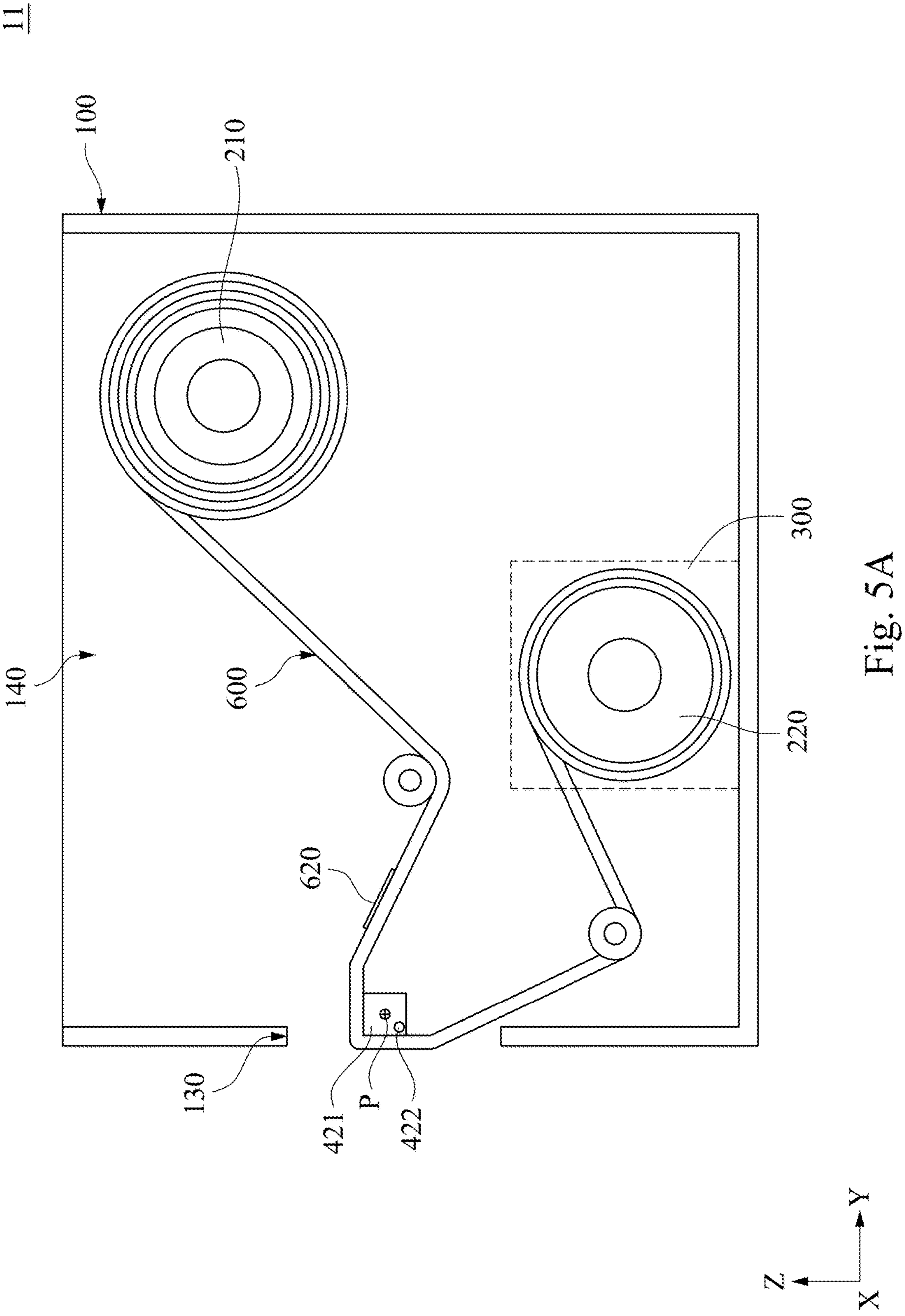

FIG. 5A and FIG. 5B are operational schematic diagrams of a label dispensing device 11 according to one embodiment of the present disclosure. As shown in FIG. 5A and FIG. 5B, the embodiment of the label dispensing device 11 and the above embodiment of the label dispensing device 10 are the substantially the same, except that, in this embodiment, the long column body 421 is a rectangular column, not a triangle column, and the long column body 421 is rotatably installed within the housing 100 through at least one pivot P, rather than statically fixed in the housing 100.

As shown in FIG. 5A, when the label dispensing device 11 is idle, the long column body 421 stays flat so that a cross section of the long column body 421 is shown as a square (FIG. 5A). On the contrary, as shown in FIG. 5A and FIG. 5B, when the label dispensing device 11 is prepared to be operated, a user can rotate the long column body 421 by 45 degrees counterclockwise (see curved arrow C, FIG. 5B) about the long axis direction (e.g., X axis direction) of the long column body 421 so as to change the cross section of the long column body 421 to be a rhombus from the square. Thus, two adjacent sides of the long column body 421 can be respectively used as the aforementioned peeling part 440 and the aforementioned gradually rising part 430, and the recycled direction and the gradually rising inclined direction are tilt, respectively. It is noted, since the corner (e.g., redirecting protrusive portion 410) of the cross section is changed to be directed upwardly, thus, compared to the square, the overall height of the rhombus increases 0.2 mm in the height.

In addition, the housing 100 further includes a latch (not shown in figures) movably disposed on the housing 100 for switchably inserting into a hole of the long column body 421 for stopping the long column body 421 from rotating.

Figure 6:
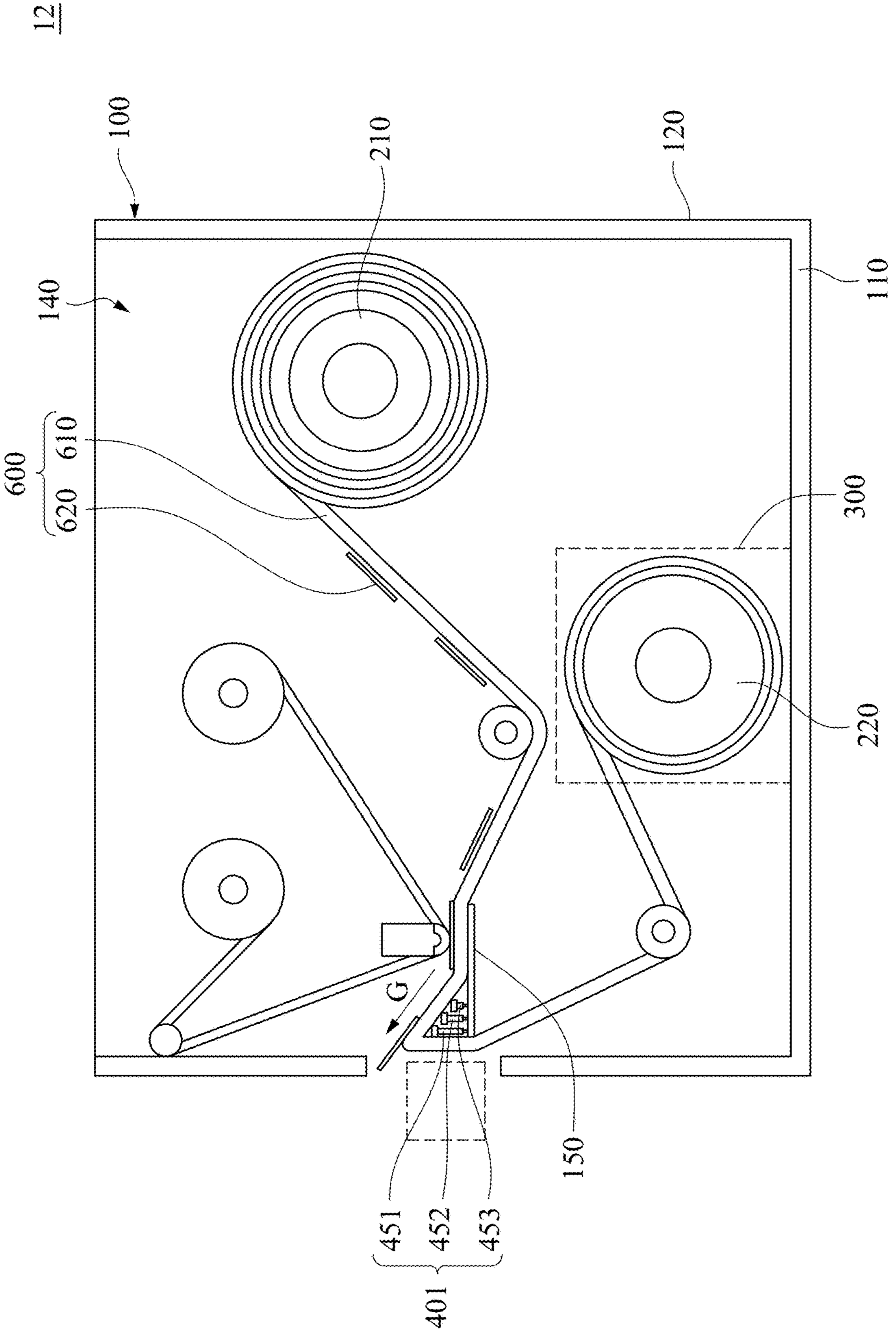
FIG. 6 is a schematic side view of a label dispensing device according to one embodiment of the present disclosure.
Figure 7:
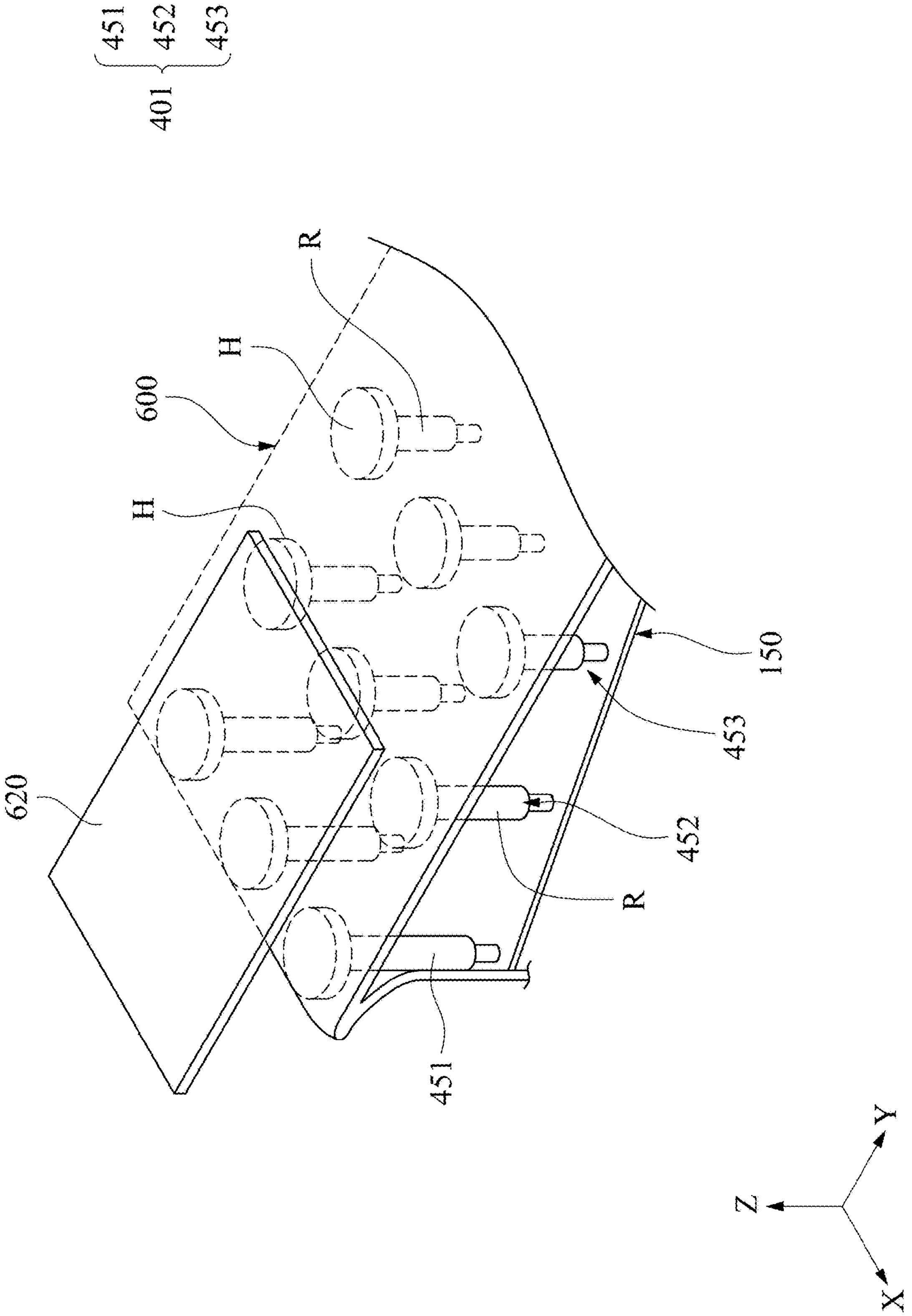
FIG. 7 is a related schematic view of the peeling mechanism and the label strip in FIG. 6.

FIG. 6 is a schematic side view of a label dispensing device 12 according to one embodiment of the present disclosure. FIG. 7 is a related schematic view of the peeling mechanism 401 and the label strip 600 in FIG. 6. As shown in FIG. 6 and FIG. 7, the embodiment of the label dispensing device 12 and the above embodiment of the label dispensing device 12 are the substantially the same, except that, in this embodiment, the peeling mechanism 401 can be divided into plural members rather than a single object.

Specifically, the peeling mechanism 401 further includes a plurality of first studs 451, a plurality of second studs 452 and a plurality of third studs 453. The second studs 452 are located between the third studs 453 and the first studs 451, and a length of each of the second studs 452 is greater than a length of each of the third studs 453, and less than a length of each of the first studs 451. Each of the first studs 451 is straightly screwed on the base 150, and the first studs 451 are linearly arranged along the rotation axis (e.g., X axis direction) of the feeding reel 210. Each of the second studs 452 is straightly screwed on the base 150, and the second studs 452 are linearly arranged along the rotation axis (e.g., X axis direction) of the feeding reel 210. Each of the third studs 453 is straightly screwed on the base 150, and the third studs 453 are linearly arranged along the rotation axis (e.g., X axis direction) of the feeding reel 210.

Furthermore, each of the first studs 451, the second studs 452 and the third studs 453 has a head H and a rod R in which one end of the rod R is screwed on the base 150, and the other end thereof is connected to the head H.

Because the heads H of the first studs 451, the heads H of the second studs 452 and the heads H of the third studs 453 are arranged along the gradually rising inclined direction G, a combination of those heads H of the first studs 451 to the third studs 453 can be served as the aforementioned gradually rising part 430. Because the rods R of the first studs 451 are extended along the gravity direction (e.g., Z axis direction), a combination of the rods R of the first studs 451 can be served as the aforementioned peeling part 440.

Thus, through the construction of the embodiments above, the label dispensing device 12 is provided with a narrower angle formed between two adjacent sides of the peeling mechanism 401, so that the strength of the label sticker 620 being teared off from the label strip 600 can be enhanced, thereby reducing the possibilities of label stickers 620 being recycled along with a release film of a label strip, so that subsequent products P can be attached with enough label stickers 620.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure covers modifications and variations of this disclosure provided they fall within the scope of the following claims and their equivalents.

What is claimed is:

1. A label dispensing device implemented to peel off label stickers from a label strip in sequence one by one, comprising:

a housing comprising a label outlet at one side of the housing;

a roll-feeding mechanism comprising a collection reel and a feeding reel which are rotatably located in the housing;

a driving mechanism connected to one of the feeding reel and the collection reel for conveying the label strip from the feeding reel to the collection reel; and a peeling mechanism installed in the housing and facing towards the label outlet, and a highest position of the peeling mechanism is provided with a redirecting protrusive portion, the peeling mechanism further comprising at least one pivot; and a rectangular column rotatably disposed within the housing through the at least one pivot, and the rectangular column having a long axis direction that is parallel to a rotation axis of the feeding reel, wherein when the rectangular column is rotated about the long axis direction of the rectangular column to change a cross section of the rectangular column to be a rhombus from a square, a corner between two adjacent sides of the rhombus is served as the redirecting protrusive portion, wherein the label strip is wound onto the feeding reel and the collection reel, respectively, and bypassed the redirecting protrusive portion, and the redirecting protrusive portion is allowed to change a conveying direction of the label strip being pulled from the feeding reel towards the label outlet into a recycled direction intersected with the conveying direction from the peeling mechanism downwardly so as to peel off one of the label stickers from the label strip.

2. The label dispensing device of claim 1, further comprising:

a label printer located between the redirecting protrusive portion and the feeding reel, and used to print one of the label stickers on the label strip.

3. The label dispensing device of claim 1, wherein an included angle formed between two adjacent sides of the redirecting protrusive portion is in a range of 60° to 75°.

4. The label dispensing device of claim 1, wherein the conveying direction of the label strip being pulled from the feeding reel towards the label outlet is gradually rising inclined, and the recycled direction is as a gravity direction.

5. The label dispensing device of claim 1, wherein the housing further comprises:

a latch movably disposed on the housing for switchably abutting against the rectangular column to stop the rectangular column from rotating.

6. The label dispensing device of claim 1, wherein the roll-feeding mechanism further comprises:

a first redirecting roller rotatably located in the housing, arranged between the peeling mechanism and the feeding reel, and used to change the conveying direction of the label strip from the feeding reel to the peeling mechanism, wherein the first redirecting roller is lower than the feeding reel and the peeling mechanism.

7. The label dispensing device of claim 1, wherein the roll-feeding mechanism further comprises:

a second redirecting roller rotatably located in the housing, arranged between the label outlet and the collection reel, and used to change the conveying direction of the label strip from the peeling mechanism to the collection reel, wherein the second redirecting roller is lower than the peeling mechanism.

8. A label dispensing device implemented to peel off label stickers from a label strip in sequence one by one, comprising:

a housing having a label outlet at one side thereof;

a roll-feeding mechanism comprising a collection reel and a feeding reel which are rotatably located in the housing, respectively;

a driving mechanism connected to one of the feeding reel and the collection reel for conveying the label strip from the feeding reel to the collection reel; and a peeling mechanism installed in the housing and arranged between the feeding reel and the label outlet, the peeling mechanism further comprising at least one pivot; and a rectangular column rotatably disposed within the housing through the at least one pivot, and the rectangular column having a long axis direction that is parallel to a rotation axis of the feeding reel wherein the label strip is wound onto the feeding reel and the collection reel respectively and bypassed the peeling mechanism, and the peeling mechanism comprises a peeling part and a gradually rising part, the gradually rising part is located between the peeling part and the feeding reel, connected to the peeling part, extended along a gradually rising inclined direction towards the label outlet, and used to guide one of the label stickers on the label strip towards the label outlet from the feeding reel, and the peeling part extends away from the gradually rising part along a recycled direction intersected with the gradually rising inclined direction, and is used to fold the label strip downwardly from the gradually rising part to peel off the one of the label stickers from the label strip when the one of the label stickers is passing the gradually rising part, wherein when the rectangular column is rotated about the long axis direction of the rectangular column to change a cross section of the rectangular column to be a rhombus from a square, two adjacent sides of the rectangular column are served as the peeling part and the gradually rising part respectively, wherein an included angle formed between the gradually rising inclined direction and the recycled direction is one of an acute angle and a right angle.

9. The label dispensing device of claim 8, further comprising:

a label printer located between the gradually rising part and the feeding reel, and used to print one of the label stickers on the label strip.

10. The label dispensing device of claim 8, wherein the included angle is in a range of 60° to 75°.

11. The label dispensing device of claim 8, wherein the housing further comprises:

a latch movably disposed on the housing for switchably abutting against the rectangular column to stop the rectangular column from rotating.

12. The label dispensing device of claim 8, wherein the roll-feeding mechanism further comprises:

a first redirecting roller rotatably located in the housing, arranged between the peeling mechanism and the feeding reel, and used to change a conveying direction of the label strip from the feeding reel to the peeling mechanism, wherein the first redirecting roller is lower than the feeding reel and the peeling mechanism.

13. The label dispensing device of claim 8, wherein the roll-feeding mechanism further comprises:

a second redirecting roller rotatably installed in the housing, arranged between the label outlet and the collection reel, and used to change a conveying direction of the label strip from the peeling mechanism to the collection reel, wherein the second redirecting roller is lower than the peeling mechanism.

* * * * *